FIG. I.

INVENTOR
GIOVANNI DI DRUSCO
ATTORNEYS.

United States Patent Office

3,298,792
Patented Jan. 17, 1967

---

3,298,792
APPARATUS FOR IMPROVED FLUIDIZED BEDS
AND REACTORS CONTAINING SAME
Giovanni Di Drusco, Bologna, Italy, assignor to Montecatini Societa Generale per l'Industria Mineria e Chimica, Milan, Italy
Filed Sept. 22, 1965, Ser. No. 489,806
Claims priority, application Italy, Sept. 28, 1961, 17,403/61
7 Claims. (Cl. 23—284)

This application is a continuation-in-part of my copending application Serial Number 226,014, filed September 25, 1962, now abandoned.

The present invention relates to a device which makes possible improved fluidized beds.

This device comprises a mobile part and a fixed part, each of which contains a series of disks or plates placed on different horizontal planes.

The present invention also relates to reactors containing this device.

Numerous reactions which take place between a gas or a vapor mixture and a solid (catalyst or reactants) are known. In these reactions, it is desirable to achieve the best possible contact between the different phases, e.g., by reducing the size of the solids so as to increase their active surface areas. If the reaction develops heat, agitation of the solid phase is also necessary in order to avoid local overheatings which can result in harmful side reactions or the inactivation of the solid phase (catalyst).

In vapor-solids reactions of this type, the granular solids are often fluidized by contact with the gases or vapors. This fluidized technique is widely used and is successfully applied to various types of reactions, either catalytic or non-catalytic, in the fields of organic and inorganic chemistry. By employing this technique, a particularly homogeneous distribution of temperature and reactant concentration is achieved in the reactor.

In order to obtain the most efficient fluidization, the gases should pass through the whole mass of granular solids as homogeneously and completely as possible, rather than being confined to a few channels or passageways. For this reason, a porous plate is normally placed at the bottom of the bed, which plate, by employing a pressure loss corresponding in general to 4 or 5 times the value of the loss along the bed, assures a uniform distribution of flow rate and the pressure at the bottom of the bed.

The problem of uniform distribution of the gases is particularly important in polymerization processes, for example the gas phase polymerization of alpha-olefins to polymers using stereospecific catalysts such as catalysts of the type shown in Italian Patent No. 526,101. In these and other types of gas-solids operations there is, however, the problem that the solids are sometimes tacky and adhere to each other, to the reactor walls and to the distributor plate. This causes agglomerations which make the bed non-uniform, promote the clogging of the pores of the distributor plate and, therefore, cause non-uniformity in the operation of the process.

When the gases contain substances which, upon reaction, also form solids this problem is increased. This formation of solids can occur just as the gases pass through the holes of the distributor plate thus plugging these holes within a short time.

These and other problems are overcome by the present invention which provides a device for achieving fluidized beds wherein a uniform distribution of the gases is obtained without the danger of having the holes of the distributor plate clog up. Further, the present invention provides a new device for distributing gases or vapors at the bottom of a fluidized bed and a reactor containing this device. In a preferred embodiment, there is provided a reactor which is particularly suitable for the polymerization or copolymerization of olefins.

It should be noted that the reactors provided with the fluidized-bed device of the present invention are suitable for use in a wide variety of processes such as the oxidation of hydrocarbons, including the oxidation of naphthalene to phthalic anhydride, and also processes such as the catalytic cracking of petroleum fractions.

The device of the present invention contains a lower fixed portion on which the gaseous fluidizing medium impinges, and a mobile portion above which the fluidized bed is formed. Each of these two portions is divided into a number of coaxial elements in the form of disks or plates, arranged in different horizontal or substantially horizontal planes. There is a space or gap between each fixed and each mobile element which forms a channel having a vertical or substantially vertical portion for the passage of the fluidizing medium. This vertical or substantially vertical portion acts as a trap to prevent any solid particles from penetrating into the zone below the distributing disk. The passage for the fluidizing medium is always kept free of any solid deposit due to the relative movement between the fixed and the mobile portions of the device which acts as a grinding element. The height of said vertical passage is between about 20 and 30 mm. while the width of said gap is between about 1 and 3 mm. It is desirable that the mobile disks or plates have a diameter which progressively decreases in an upward direction.

These mobile disks have a vertical side at the inner end of a flat annular portion. A tie-rod affixed to this flat portion connects the disk to a section of a member which is rotated by a driving shaft.

The fixed disks of this device have a flat annular portion and two vertical sides and are arranged on a section possessing niches or steps N.

According to another particular feature of the invention it has been found that it is especially convenient to use this device in the lower part of a vertical, inverted truncated reactor, such as one having a vertex angle between 15° and 45°, preferably between 20° and 30°.

The reactor can also be provided with a wall scraper.

The device of the present invention is more clearly seen by reference to the accompanying FIGURES 1–4.

Figure 1:
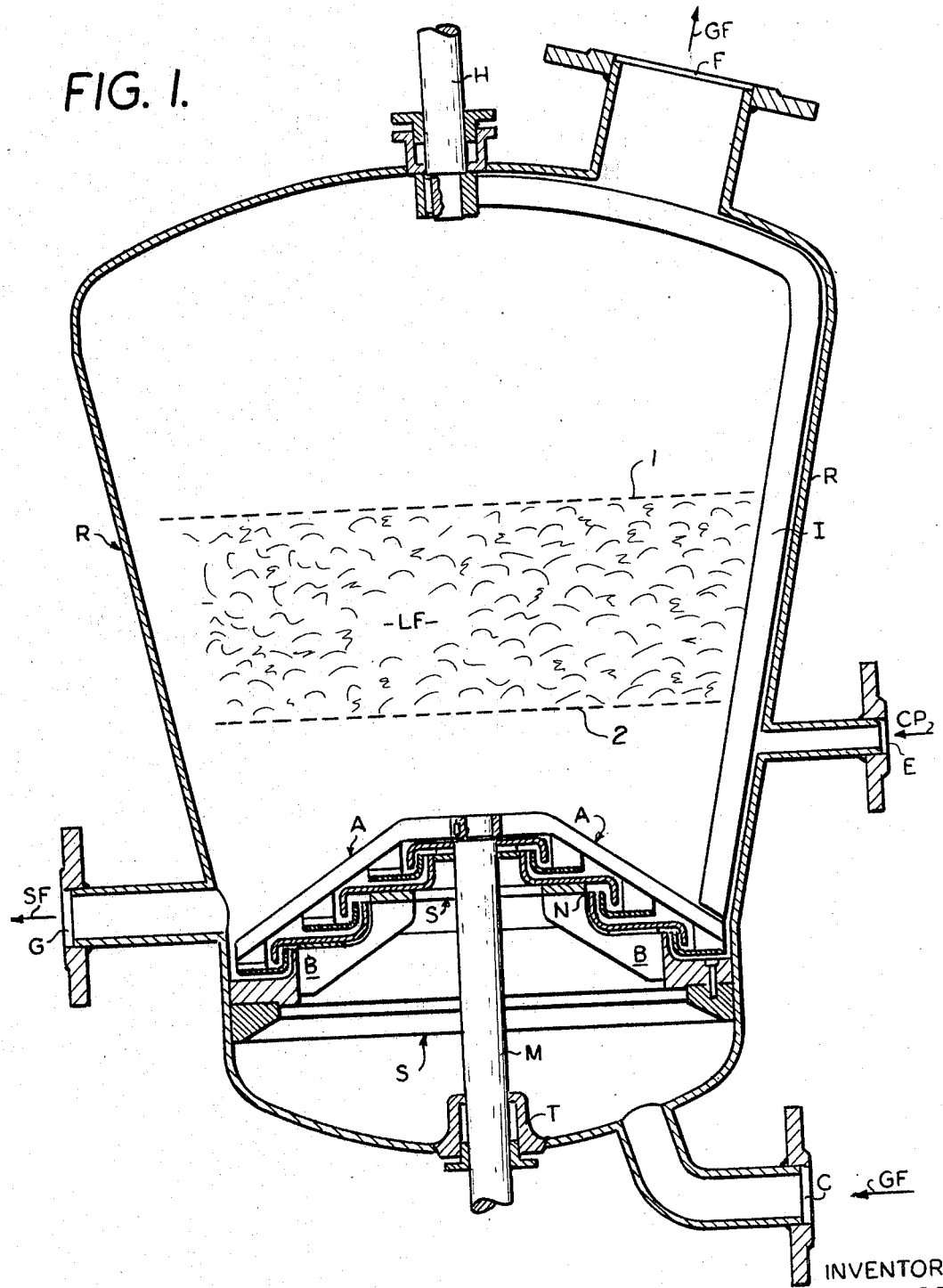
FIGURE 1 is a schematic section in a vertical plane of a reactor containing the device of the present invention.

In FIGURE 1, R indicates a reactor provided with a device for the formation of a fluidized bed LF according to the present invention. This device comprises a mobile portion A which is actuated by driving shaft M, and a fixed portion B, which is supported by supports S present in the lower part of reactor R.

Reactor R is provided with a duct or gate C for introducing fluidization gases GF; a duct or gate E for introducing the catalyst or solid reactant CP; a gate F for the exit of the fluidization gases; a duct G for the exit of the fluidized solids SF and finally a scraper I, which is actuated by driving shaft H, and is used in the event tacky solids capable of adhering to the reactor walls are formed.

According to a preferred embodiment of the invention, the reactor has a conical shape, with a vertex angle between 15° and 45°, preferably between 20° and 30°. A reactor of this configuration is employed in order to decrease the flow-rate of the gases in the upper part of the reactor and to decrease the entrainment of the solids by the fluidization gases. The conical shape (the volume of the reactor being the same) makes it possible to achieve an easier and more regular fluidization and also to use a distributor plate having a smaller diameter. Under these conditions, a fluidized bed LF is brought about which is mainly concentrated in the zone between the lines 1 and 2.

The conical shape is found to be particularly convenient when the fluidized solid material has a very wide granulometric distribution, because in such a case it is necessary to use a velocity for the fluidization medium which is greater than that required for the minimum fluidization of the heavier solid particles. Such a fluidization medium velocity in a cylindrical vessel would be virtually constant throughout the height of the vessel, and would therefore carry the smaller particles out of the bed. With an inverted conical shape, however, the velocity decreases from the bottom to the top of the fluidized bed, so that no small particles are carried out of the top part of the bed.

By a proper selection of the taper of the vessel and the velocity of the fluidization medium, it is possible to maintain a good fluidization at the bottom of the reactor while at the same time keeing the velocity of the fluidization medium in the highest part of the bed less than or equal to the minimum fluidization velocity.

Figure 2:
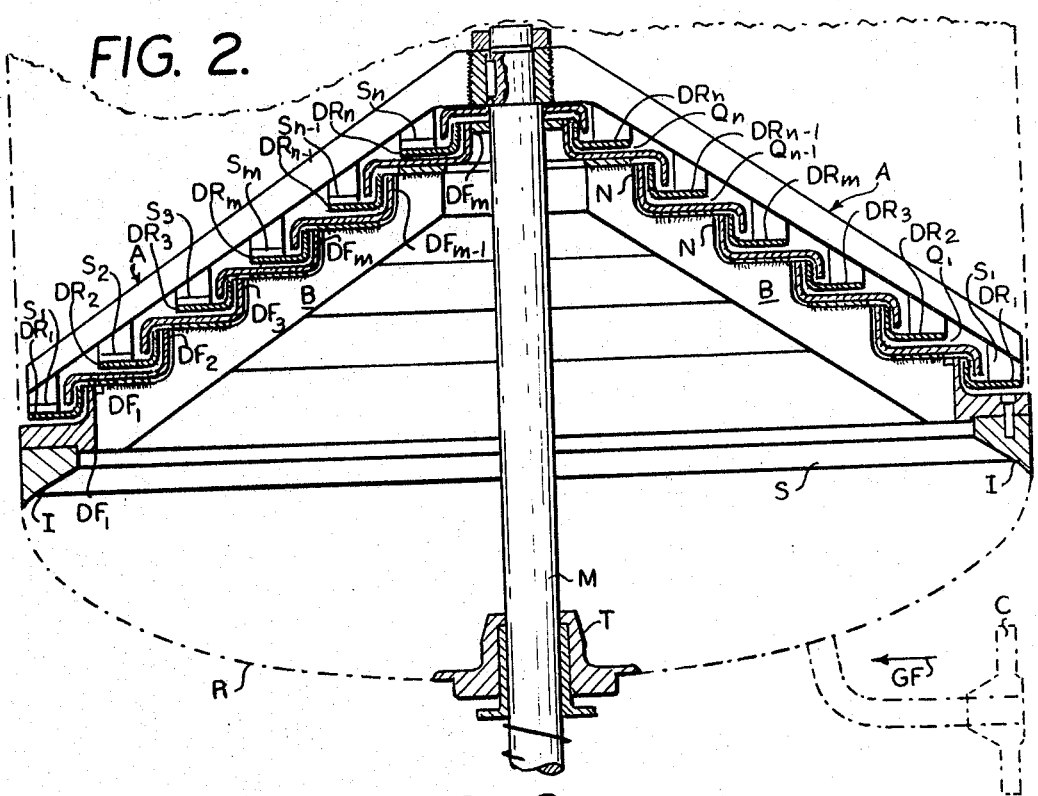
FIGURE 2 is a larger scale representation of the lower portion of the reactor of FIGURE 1.

FIGURE 2 further shows the device of the present invention on an enlarged scale. From this representation it can be better seen that mobile part A, which is actuated by driving shaft M, rotates a series of mobile disks $DR_1$, $DR_2$, $DR_n$, etc. Each mobile disk $DR_1$, $DR_2$, etc., is connected to section A by a tie-rod $S_1$, $S_2$, ... $S_n$, etc.

From FIGURE 2, it can also be seen that mobile disks $DR_1$–$DR_n$ are coaxial, contain an annular part having almost the same width and are arranged in horizontal planes lying at different heights.

Mobile disks $DR_1$–$DR_n$ are interposed between fixed disks $DF_1$–$DF_n$. These fixed disks are located on section B, which supports the stationary parts of the device of the present invention. Between mobile disks $DR_2$–$DR_n$ and the corresponding fixed disks $DF_1$–$DF_n$, there are channels $Q_1$–$Q_n$ through which pass the fluidization gases or vapors coming from lower gate C.

The movement of mobile disks $DR_n$ causes a relative movement between the walls through which the gases pass whereby any solid deposit caused by the substances contained in the fluidization gases is disintegrated. A clear channel for the gases during the whole period of operation of the reactor is thus assured.

Figure 3:
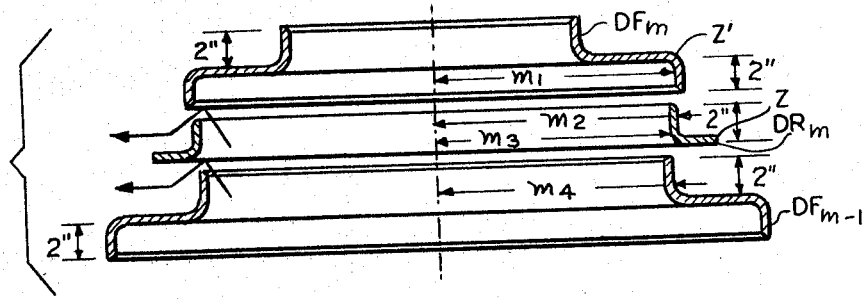
FIGURE 3 is a more enlarged vertical section of the novel device.
Figure 4:
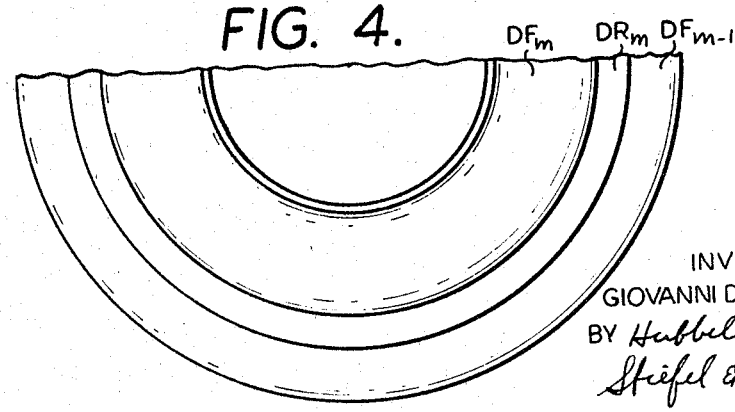
FIGURE 4 shows a plan view of the mobile and fixed members of the device.

FIGURES 3 and 4 represent an enlarged sectional view and a plan view, respectively, of mobile disk $DR_m$ and the corresponding fixed lower disk ($DF_{m-1}$) and upper ($DF_m$) disk.

As can be seen from FIGURE 3, mobile disks $DR_m$ contain an annular zone or sector Z and a web 1. Each fixed disk contains two webs 1' and 1" and one annular sector Z'.

In FIGURE 3 are shown the radii $m_2$ and $m_3$ of the mobile disk and radii $m_1$ and $m_4$ of the fixed disks $DF_m$ and $DF_{m-1}$.

The heights 1, 1' and 1" of mobile disks $DR_m$ and of fixed disks $DF_{m-1}$ and $DF_m$ represent important parameters. These heights may be the same or different for the two different types of disks, but they should be selected with reference to and as a function of the particular physical environment of the process, particularly the granulometry of the fluidized solid, the gas flow-rate, the "shoe-angle" of the polymer and the fouling power of the fluidization gas.

Also radii $m_1$ and $m_4$ of the fixed disks and $m_2$ and $m_3$ of mobile disks are selected depending on the type of reaction, the fluidized solid present, etc. It is very important that these diameters be selected as a function not only of the characteristics of the fluidized solid, but also of the heights 1, 1' and 1".

According to a preferred feature of the present invention it has been found particularly convenient to give the same value to 1, 1' and 1" of the disks $DF_n$, $DR_n$ and $DF_{n-1}$ and also to keep equal the values $m_1-m_2$ and $m_3-m_4$, so that, if 1=constant, $m_1-m_2=m_3-m_4$.

In the same preferred embodiment it has been found that 1 must preferably be greater than 20 mm., so that $m_1-m_2=m_3-m_4$ can be kept within the range between 0.5 and 3.5 mm.

The flow-rate of the gases in the upper portion of the fluidized bed can also be considered as a critical factor. In olefin polymerizations, it has been found that particular advantages are obtained with flow-rates between 4 and 5 m./second.

The present invention will now be illustrated by the following examples which refer to a particular type of polymerization, but it should be understood that the invention is not limited to these embodiments since the present device can be advantageously used in any type of reaction occurring between gases and solids.

In fact, particularly good results are obtained when using the present device in the oxidation of naphthalene to phthalic anhydride with a $V_2O_5$ catalyst in the fluidized phases and in the catalytic cracking of petroleum fractions in a fluidized bed using silica-alumina catalysts.

*Example 1*

The reactor used has the following dimensions:

| | |
|---|---|
| Diameter of the distributor plate _____mm__ | 510 |
| Cone angle _____degrees__ | 21 |
| Height of the reactor from the base of the distributor plate at the connection between truncated cone and the reactor cover _____mm__ | 1300 |
| Volume of the fluidized bed _____liters__ | 350 |
| Height of the fluidized bed _____mm__ | 900 |
| Capacity of the reactor _____liters__ | 800 |
| Diameter of the reactor base _____mm__ | 500 |
| Mobile disks: 5; fixed disks: 6 (1=30 mm.; $m_1-m_2=m_3-m_4=1.5$ mm.). | |
| Top fixed disk diameter _____mm__ | 100 |
| Bottom fixed disk diameter _____mm__ | 420 |

The polymerization run is carried out under the following conditions:

| | |
|---|---|
| Rotation speed of the distribution plate __r.p.m.__ | 15 |
| Rotation speed of the scraping knife _____ r.p.m.__ | 10 |
| Temperature of the fluidization gas determined at the inlet (gate C) _____degrees__ | 72 |
| Temperature of the reactor _____do____ | 82 |
| Working pressure, atmosphere _____ | 4.5 |
| Flow-rate of the recycle gases (propylene) Nm.$^3$/h__ | 400 |
| $TiCl_3$ feed _____kg./h__ | 0.010 |
| $Al(C_2H_5)_3$ feed _____kg./h__ | 0.038 |

The catalyst components are fed in the form of a preformed catalyst (previously prepared) through gate E.

The specific production of 20 g. of polypropylene per hour per liter is obtained, corresponding to a yield of 160 g. per g. of catalyst.

The polymer obtained possesses the following characteristics:

| | |
|---|---|
| Flexural strength (ASTM D 747/58) _____ | 10,000 |
| Residue after heptane extraction _____percent__ | 90 |
| Residue after ether extraction _____do____ | 96 |
| Average molecular weight _____ | 200,000 |
| Crystallinity under X-ray examination__percent_ | 50 |

After 2000 hours of a continuous and regular operation the reactor is opened to examine the state of the inner part of the reactor and the distributor plate. No fouling is found which was to be expected since, during the run, it was determined that the pressure drop at the ends of the distributor plate remained practically constant.

*Example 2*

Using the apparatus of the preceding example, a run is carried out under the following conditions:

| | |
|---|---|
| Rotation speed of the distributor plate _____ r.p.m__ | 15 |
| Rotation speed of the scraper _____ r.p.m___ | 10 |
| Temperature of the fluidization gas entering the reactor _____° C__ | 72 |
| Temperature in the reactor _____° C__ | 90 |
| Working pressure _____atm__ | 3 |
| Flow-rate of the recycle gas (ethylene containing 15% of hydrogen) _____Nm³/h__ | 600 |
| TiCl₃ feed _____kg./h__ | 0.03 |
| Al(C₂H₅)₂Cl _____kg./h__ | 0.04 |

In this example, the catalyst components are separately introduced: $TiCl_3$ through gate C while the organic aluminum compound is fed in the form of a vapor which saturates the fluidization olefin. Hydrogen is used for regulating the molecular weight of the polymer.

The specific production of 20 g. of polyethylene per hour per liter, corresponding to a yield of 100 g. of polymer per gram of catalyst, is obtained.

The polymer obtained possesses the following characteristics:

| | |
|---|---|
| Molecular weight _____ | 80,000 |
| Flexural strength _____kg./cm.²__ | 11,000 |
| Crystallinity under X-ray examination__percent__ | 84 |

The run, which is prolonged without any difficulties for more than 1000 hours, is carried out in a regular manner and the reactor is found to be clean and free of fouling.

*Example 3*

The polymerization described in Example 1, is conducted in a truncated conical reactor of the dimensions shown in Example 1.

It is determined that for a fixed gas-flow of 400 normal cubic meters per hour, the linear gas velocity corresponds to 0.13 m./sec. at the bottom of the reactor and 0.034 m./sec. at the top of the reactor (i.e., at the height of 1300 mm. from the bottom).

Under these conditions when the minimum fluidization velocity (at 82° C. and 4.5 atm.) according to the granulometry of the fluidized solids is 0.0275 m./sec., the gas velocity at the bottom of the reactor is clearly sufficient to maintain an effective and complete fluidization. At the same time, at the output end of the reactor the gas velocity is scarcely higher than the minimum fluidization velocity and therefore there is no appreciable loss of pulverized solids. The fluidization in the upper part of the reactor is already secured by the effective motion of the solids in the lower part.

For comparison, the reaction is carried out in a cylindrical reactor (with reference to the shape of the part over the distributor plate) having the same height (1300 mm.) and volume (approximately 600 liters) and a corresponding internal diameter of 764 mm. By maintaining the same recycle gas-flow, the linear gas velocity is constant along the whole section and has a value of 0.058 m./sec. That is, the input velocity is half the corresponding velocity in the conical reactor, whereas at the output end, the same constant velocity is twice the value of the minimum fluidization velocity. This results in a carry-over of the solids, which, depending on the granulometry of the polymer, amounts to a loss of about 5%.

Many variations and modifications can, of course, be practised without departing from the scope and spirit of the present invention.

Having thus described the invention, what it is desired to secure and claim by Letters Patent is:

1. A distributor device for establishing a fluidized bed which comprises coaxial alternating fixed and mobile disks spaced apart from each other on a vertical axis, the outer diameters of adjacent disks decreasing in an upward direction along said vertical axis, said mobile disks comprising a flat-annular portion having at the inner end thereof an upwardly directed vertical side, said fixed disks comprising a flat-annular portion having an upwardly directed vertical side at the inner end thereof and a downwardly directed vertical side at the outer end thereof, the flat-annular portion of a given fixed disk being wider than the flat-annular portion of the mobile disk immediately thereabove, a portion of the outer vertical side of a fixed disk exteriorly overlapping the vertical side of the mobile disk immediately therebeneath and a portion of the inner vertical side of a fixed disk interiorly overlapping the vertical side of the mobile disk immediately thereabove, said disks thereby forming a series of coaxial channels having a substantially vertical portion, and means associated with said mobile disks for rotating said mobile disks about said vertical axis whereby the relative movement between said mobile disks and said fixed disks prevents obstruction of said channels by solid particles during operation of said distributor device.

2. The device of claim 1 wherein said flat-annular portions of said mobile disks are joined by connecting means to a member connected to a driving shaft and said fixed disks are supported by a stationary member having a step-like shape.

3. The device of claim 1 wherein the vertical sides of the fixed and mobile disks are of substantially the same heights.

4. A fluidized bed reactor, which comprises the distributor device of claim 1 in the lower portion thereof, inlet means below said device for introducing a fluidizing medium, inlet means above said device for introducing the solids to be fluidized, outlet means at the top of said reactor for discharging the fluidizing medium, and outlet means for discharging the reaction product.

5. The reactor of claim 4, which includes a vertically-located scraper actuated by a driving shaft for removing solid particles adhering to the walls of the reactor.

6. The reactor of claim 4, which has a vertical, inverted truncated conical shape with a vertex angle between 15 and 45° in the portion thereof substantially above said distributor device.

7. The reactor of claim 6, wherein the vertex angle is between 20 and 30°.

References Cited by the Examiner

UNITED STATES PATENTS

| | | | |
|---|---|---|---|
| 2,020,431 | 11/1935 | Osborne et al. | |
| 2,513,369 | 7/1950 | Shaw. | |
| 2,668,041 | 2/1954 | Knibbs _____ | 23—288 XR |
| 2,687,343 | 8/1954 | Crask et al. _____ | 23—288 |
| 2,740,698 | 4/1956 | Helwig _____ | 23—288 |
| 2,906,608 | 9/1959 | Jequier _____ | 23—284 |
| 2,936,303 | 5/1960 | Goins _____ | 260—93.7 |
| 3,053,648 | 9/1962 | Stephens et al. | |
| 3,206,287 | 9/1965 | Crawford _____ | 23—285 |

MORRIS O. WOLK, *Primary Examiner.*

JOSEPH SCOVRONEK, *Examiner.*